(12) United States Patent
Stuth, Sr. et al.

(10) Patent No.: US 7,252,766 B2
(45) Date of Patent: Aug. 7, 2007

(54) WASTEWATER TREATMENT SYSTEM AND METHOD

(75) Inventors: William L. Stuth, Sr., 3124 W. Lake Morton Dr. SE., Kent, WA (US) 98042; Matthew M. Lee, Kent, WA (US)

(73) Assignee: William L. Stuth, Sr., Kent, WA (US)

( * ) Notice: Subject to any disclaimer, the term of this patent is extended or adjusted under 35 U.S.C. 154(b) by 0 days.

(21) Appl. No.: 11/521,526

(22) Filed: Sep. 13, 2006

(65) Prior Publication Data

US 2007/0007202 A1    Jan. 11, 2007

Related U.S. Application Data

(63) Continuation of application No. 11/059,187, filed on Feb. 15, 2005, now abandoned.

(51) Int. Cl.
C02F 3/06 (2006.01)
C02F 3/30 (2006.01)

(52) U.S. Cl. ............... 210/605; 210/617; 210/621; 210/629; 210/150; 210/151; 210/195.1; 210/256; 210/532.2

(58) Field of Classification Search ........... 210/605, 210/615, 617, 621, 629, 150, 151, 194, 195.1, 210/197, 256, 532.2
See application file for complete search history.

(56) References Cited

U.S. PATENT DOCUMENTS

| 877,569 A | 1/1908 | Joseph |
| 2,283,166 A | 5/1942 | Buell et al. |
| 2,388,795 A | 11/1945 | Montgomery et al. |
| 2,553,228 A | 5/1951 | Yonner |
| 2,822,329 A | 2/1958 | Griffith |
| 3,238,124 A | 3/1966 | Burton |
| 3,412,864 A | 11/1968 | Okada |
| RE26,716 E | 11/1969 | Cirrincione |
| 3,494,463 A | 2/1970 | Vernette |
| RE27,721 E | 8/1973 | Klock |
| 3,823,825 A | 7/1974 | Bergles et al. |
| 3,841,999 A | 10/1974 | Bennett et al. |
| 3,850,808 A | 11/1974 | Hoermann |
| 3,879,292 A | 4/1975 | McClive |
| 3,954,612 A | 5/1976 | Wilkerson |
| 3,966,599 A | 6/1976 | Burkhead |
| 3,966,608 A | 6/1976 | Mason et al. |
| 3,972,965 A | 8/1976 | Higgins |
| 4,011,162 A | 3/1977 | Oldham et al. |

(Continued)

FOREIGN PATENT DOCUMENTS

| JP | 57-122997 | 7/1982 |
| JP | 59-19584 | 2/1984 |
| JP | 59-15714 | 4/1984 |
| JP | 61-271-090 | 12/1986 |
| JP | 62-279888 | 12/1987 |

Primary Examiner—Christopher Upton
(74) Attorney, Agent, or Firm—Dowrey Rickards PLLC

(57) ABSTRACT

A system, method and apparatus for treating wastewater containing biodegradable material wherein a submerged stand alone perforated cylinder reactor pod containing aerobic bacterial growth media and a draft tube with air pressure induced pumping action creates a spray or splash pattern so as to recirculated aerated liquor through the media and also to the area surrounding the cylinder pod. Free interchange of mixed and unmixed liquor is provided via the perforations in the cylindrical pod wall. Provision is also made for back flushing the media and returning mixed liquor to an area remote from the reactor pod.

36 Claims, 6 Drawing Sheets

U.S. PATENT DOCUMENTS

| | | |
|---|---|---|
| 4,039,437 A | 8/1977 | Smith et al. |
| 4,043,912 A | 8/1977 | Bascope et al. |
| 4,137,171 A | 1/1979 | Yokata |
| 4,231,863 A | 11/1980 | Sutphin |
| 4,251,359 A | 2/1981 | Colwell et al. |
| 4,293,421 A | 10/1981 | Green |
| 4,336,135 A | 6/1982 | Price |
| 4,391,703 A | 7/1983 | Crosby |
| 4,420,397 A | 12/1983 | Kaneko et al. |
| 4,439,323 A | 3/1984 | Ball |
| 4,465,594 A | 8/1984 | Laak |
| 4,582,611 A | 4/1986 | Wang |
| 4,599,174 A | 7/1986 | McDowell |
| 4,614,584 A | 9/1986 | Di Duca |
| 4,627,917 A | 12/1986 | Morper |
| 4,680,111 A | 7/1987 | Ueda |
| 4,710,295 A | 12/1987 | Zabel |
| 4,810,377 A | 3/1989 | Kato et al. |
| 4,812,237 A | 3/1989 | Cawley et al. |
| 4,818,384 A | 4/1989 | Mayer |
| 4,822,485 A | 4/1989 | Mayer |
| 4,826,601 A | 5/1989 | Spratt et al. |
| 4,892,658 A | 1/1990 | Martin et al. |
| 4,895,645 A | 1/1990 | Zorich, Jr. |
| 4,933,076 A | 6/1990 | Oshima et al. |
| 4,971,690 A | 11/1990 | Justice |
| 4,995,980 A | 2/1991 | Jaubert |
| 4,997,562 A | 3/1991 | Warner |
| 5,030,353 A | 7/1991 | Stuth |
| 5,049,266 A | 9/1991 | Gotz et al. |
| 5,156,742 A | 10/1992 | Struewing |
| 5,160,620 A | 11/1992 | Lygren |
| 5,200,081 A | 4/1993 | Stuth |
| 5,202,027 A | 4/1993 | Stuth |
| 5,242,584 A | 9/1993 | Hoarau |
| 5,258,121 A | 11/1993 | Jordan et al. |
| 5,288,407 A | 2/1994 | Bodwell et al. |
| 5,308,479 A | 5/1994 | Iwai et al. |
| 5,352,357 A | 10/1994 | Perry |
| 5,382,357 A | 1/1995 | Nurse |
| 5,382,363 A | 1/1995 | Boylen |
| 5,454,949 A | 10/1995 | Davis et al. |
| 5,480,561 A | 1/1996 | Ball et al. |
| 5,484,524 A | 1/1996 | MacLaren et al. |
| 5,486,291 A | 1/1996 | Todd et al. |
| 5,527,453 A | 6/1996 | Hachima |
| 5,575,908 A | 11/1996 | Mondragon, Jr. |
| 5,582,716 A | 12/1996 | Nurse, Jr. |
| 5,609,754 A | 3/1997 | Stuth |
| 5,618,414 A | 4/1997 | Goupil et al. |
| 5,620,602 A | 4/1997 | Stuth |
| 5,667,689 A | 9/1997 | Graves |
| 5,690,824 A | 11/1997 | Stuth |
| 5,690,827 A | 11/1997 | Simmering et al. |
| 5,762,784 A | 6/1998 | Jowett |
| 5,766,475 A | 6/1998 | Mayer et al. |
| 5,989,416 A | 11/1999 | Gorton |
| 5,997,735 A | 12/1999 | Gorton |
| 6,024,870 A | 2/2000 | Thompson |
| 6,063,268 A | 5/2000 | Jowett |
| 6,174,433 B1 | 1/2001 | Futami |
| 6,551,508 B1 | 4/2003 | Bovington |
| 6,554,996 B1 | 4/2003 | Rebori |
| 6,605,219 B2 | 8/2003 | Lambert |
| 6,652,743 B2 | 11/2003 | Wallace et al. |
| 6,763,950 B2 | 7/2004 | Graves |
| 6,787,035 B2 | 9/2004 | Wang |
| 6,942,788 B1 | 9/2005 | Cox et al. |

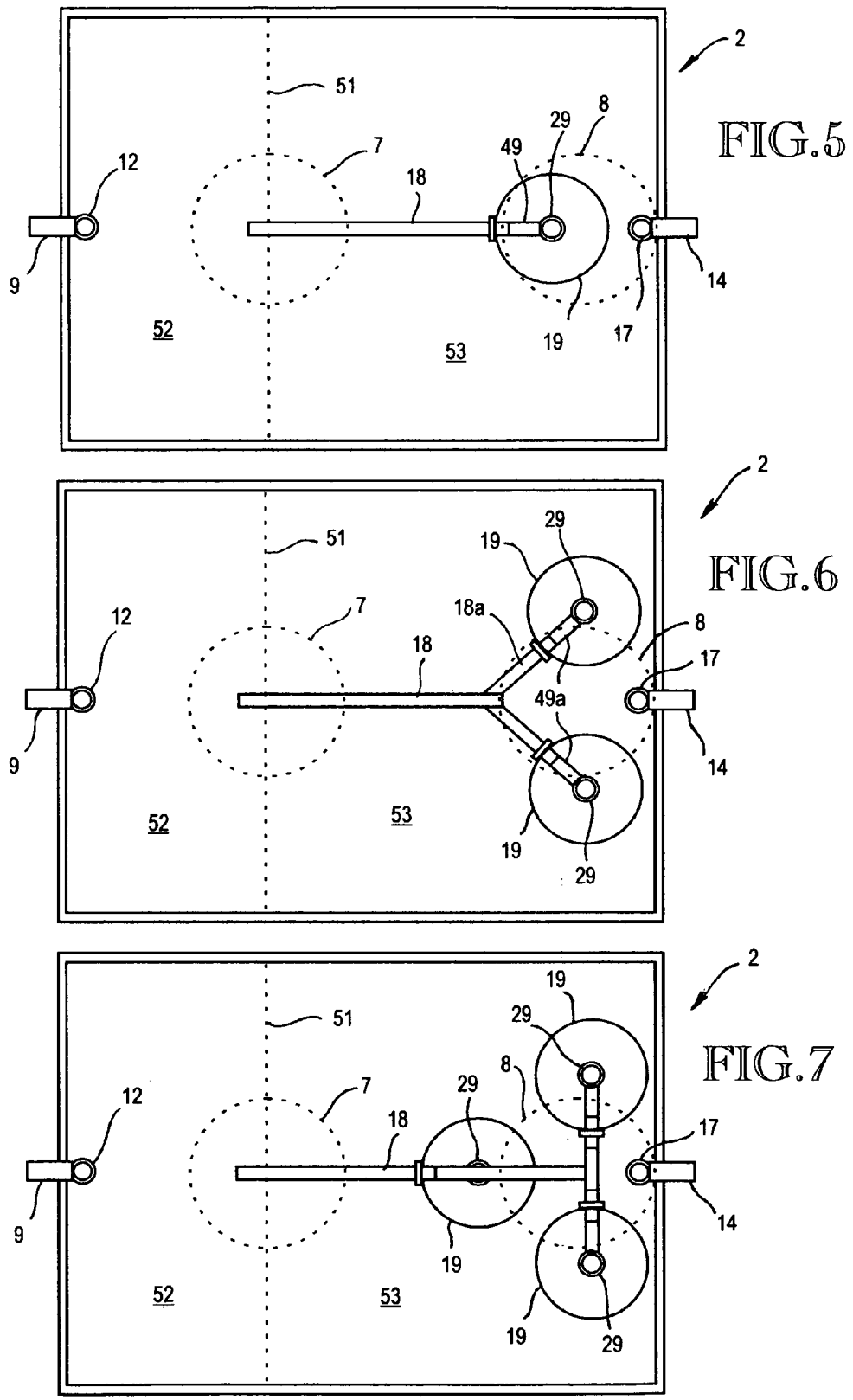

WASTEWATER TREATMENT SYSTEM AND METHOD

CROSS REFERENCE TO RELATED APPLICATIONS

The present application is a continuation of my prior patent application Ser. No. 11/059,187, filed Feb. 15, 2005 now abandoned.

BACKGROUND

1. Field of the Invention

The present invention relates to on-site wastewater (sewage) treatment systems and processes, and more particularly to a stand-alone aerobic treatment unit or pod system for promoting oxygen transfer and aerobic bacterial activity in conjunction with conventional septic tank systems for family residences and commercial establishments.

2. Description of the Prior Art

At present, many single and multiple family dwelling units as well as small commercial installations rely upon the well known process of wastewater (sewage) disposal involving a septic tank and drain field installation. In these installations the biodegradable wastewater contains a wide variety of solid and liquid materials which are introduced directly from the source into a septic tank for primary treatment. The septic tank itself functions as a settling chamber in which the solids are allowed to settle out in a quiescent zone with both liquids and solids being subjected to digestion exclusively by anaerobic micro organisms. The anaerobic liquor or effluent, free of most solids, is then discharged directly into a drain field for final disposal. One common form of septic tank system includes at least two chambers with the primary chamber receiving the raw wastewater where the solids are allowed to settle to the bottom. The liquor then transfers to a second chamber where further settling and anaerobic digestion is allowed to proceed. The effluent then drains off to a drain field. The anaerobic treatment system is extremely slow compared to aerobic processes whereby oxygen is introduced and absorbed into the wastewater so that aerobic micro organisms are relied upon to provide aerobic metabolism of sewage organics. The aerobic system of sewage treatment is not only more rapid than anaerobic treatment but also eliminates offensive odors and oft times pollution of the environment caused by odiferous insufficiently treated wastewater from aging or overloaded septic tank systems. A multitude of systems have been proposed in the prior art for increasing the efficiency and effectiveness of septic tank systems in the nature of chemical treatment plants, filter systems and secondary sewage treatment systems for aeration of the liquids discharged, either from the septic tank or directly from the source. Filter systems and/or chemical treatment processes have been used for both large and smaller installations, however, such systems tend to be complex, expensive to install, unreliable and difficult to maintain. Examples of prior art secondary sewage treatment systems using aeration and aerobic bacterial growth media are disclosed in U.S. Pat. Nos. 5,030,353; 5,200,081; 5,202,027; and 5,609,754.

In some instances, reactors containing microbial growth media and/or filtering devices incorporating aeration features to treat the liquid effluent have been proposed for use in conjunction with septic tanks. One example of this type of device may be found in U.S. Pat. No. 5,554,996. In this type of device, air is diffused into a reactor chamber so as to cause liquor to recirculate within the reactor chamber in the presence of microbial growth media with the reactor chamber being connected directly to the outflow of the treatment tank. Thus, only the liquor-effluent within the reactor chamber is being aerated and mixed, leaving the balance of the volume within the settlement tank untreated. The major part of the septic tank thus remains anaerobic with the usual inefficient and slow odor producing decomposition attendant standard septic tank systems. In addition, all wastewater entering the septic tank must pass through the reactor chamber on its way to the outlet of the tank. The volume of liquor treated is thus limited and frequent clogging of the media and/or filter system may occur with ultimate failure of the tank system during overload periods or after long use. Systems of this type may also employ pumping devices which must be regulated in such a manner as to accommodate variations in flow volume and timed dosing, resulting in frequent failures and a fluctuating liquid depth within the septic tank. Since all sewage is not created equal and may vary widely over any given time period in terms of strength, volume and composition, these shortcomings are of great concern.

In view of the foregoing, there remains a continuing need for a system with greater efficiency and reliability for the treatment of wastewater and sewage in primary treatment systems such as standard septic tanks of all configurations as well as other traditional anaerobic digestion systems. To be successful, the system must be of a nature that is adaptable for retrofitting existing septic tank systems of all sizes and have the ability to increase the dissolved oxygen content of the otherwise anaerobic liquor so as to promote aerobic microbial digestion processes in the entire tank volume. Expensive pumping systems and dosing mechanisms which require constant maintenance must be avoided. There is also a need for the ability to back-flush and clear the microbial growth medium of organic build up to prevent clogging and to increase effectiveness without extensive reworking or modification of the system. Back flushing may also be used in situations where the unit is organically overloaded and additional air entrainment points are required to increase the available oxygen necessary for treatment. In order to provide for increased usage or loading of the septic system, provision must also be made for increasing or decreasing the treatment units within an existing septic system without major overhaul or reworking of the existing septic system.

SUMMARY

A system and method is provided for oxygen enrichment of wastewater within a wastewater tank of the type that is normally subjected to anaerobic decomposition of biodegradable materials. The wastewater tank will normally be provided with inlet and outlet fittings for maintaining a constant level of wastewater within the tank, the effluent being disposed of in the drain field or the like. The septic tank may or may not be divided into separate compartments but, in any event, will have a settling zone where solids are settled out from the wastewater forming the liquor within the tank. According to the present system and method, oxygen is introduced into the liquor in a mixing zone with the introduction of air under pressure to create and aerating spray or splash zone with aerated liquor being mixed with the untreated liquor in the tank to convert the anaerobic liquor to an aerobic condition before exiting the tank.

The aerobic microbial digestion process is accomplished by a reactor pod located preferably in a mixing zone in the general area adjacent the outlet of the tank. In the preferred embodiment, the reactor pod comprises a cylinder having a multitude of perforations in the wall thereof which is submerged in the liquor. A draft tube is located within the cylindrical pod and an air pressure source introduces an air stream which pumps liquid vertically upwardly through the draft tube and creates a splash or spray pattern above the surface of the water level, serving to aerate the expelled liquor. Aerobic microbial media is contained in the cylindrical pod and a portion of the aerated liquor in the spray pattern is returned and allowed to pass downwardly through the media and to be recirculated through the draft tube and spray pattern. In addition, the spray pattern is configured to deliver a substantial portion of the aerated liquor outside of the perimeter of the reactor pod and returned to the unmixed liquor in the general volume of the tank. Since the walls of the pod are perforated, there is a free exchange of mixed and unmixed liquor between the general volume of the tank and microbial growth media in the pod. The reactor pod is not connected nor does it deliver treated effluent to the outlet of the tank, thus not only providing treatment for liquor within the pod but also treating of the liquor in the general volume of the tank.

In order to increase the effectiveness of the treatment of the liquid in the tank, a return line may be installed for the purpose of collecting a predetermined volume of oxygen rich aerated liquor from the spray pattern and returning it to the quiescent or settling zone of the tank in the general area of the inlet. In this manner, the entire volume of the tank may be converted from an anaerobic to an aerobic digestion processes. A buoyant microbial growth media is preferred for containment in the cylindrical reactor pod. Although this media does not tend to incur flocculent build up during normal operation, a back flushing feature for scrubbing off organic build up and preventing the process from becoming anaerobic is provided. A back flushing air pressure manifold is located in the bottom end of the cylindrical pod which may release air jets upwardly from a manifold in order to scrub off organic build up and to create a turbulent zone to increase treatment and oxygen transfer if desired.

Additional features may include the ability to add or withdraw self contained stand alone reactor pods to accommodate the actual organic waste load at a given site or under given conditions of loading. The pod as described is preferably a circular open ended cylinder supported on the bottom of the septic tank. When used in the normal septic tank environment, the tank will be fitted with access openings and the diameter of the cylindrical pods may be chosen so as to allow for easy insertion and withdrawal of pod units as the situation dictates. This is also made possible by the fact that the reactor pods can be made as a stand alone self contained unit not connected in any way to the structure of the septic tank.

BRIEF DESCRIPTION OF THE DRAWINGS

FIGS. 5-7 are diagrammatic illustrations of installations utilizing 1, 2 and 3 cylindrical pods respectively in an optionally divided chamber septic tank system;

DETAILED DESCRIPTION OF THE PREFERRED EMBODIMENT

Figure 1:
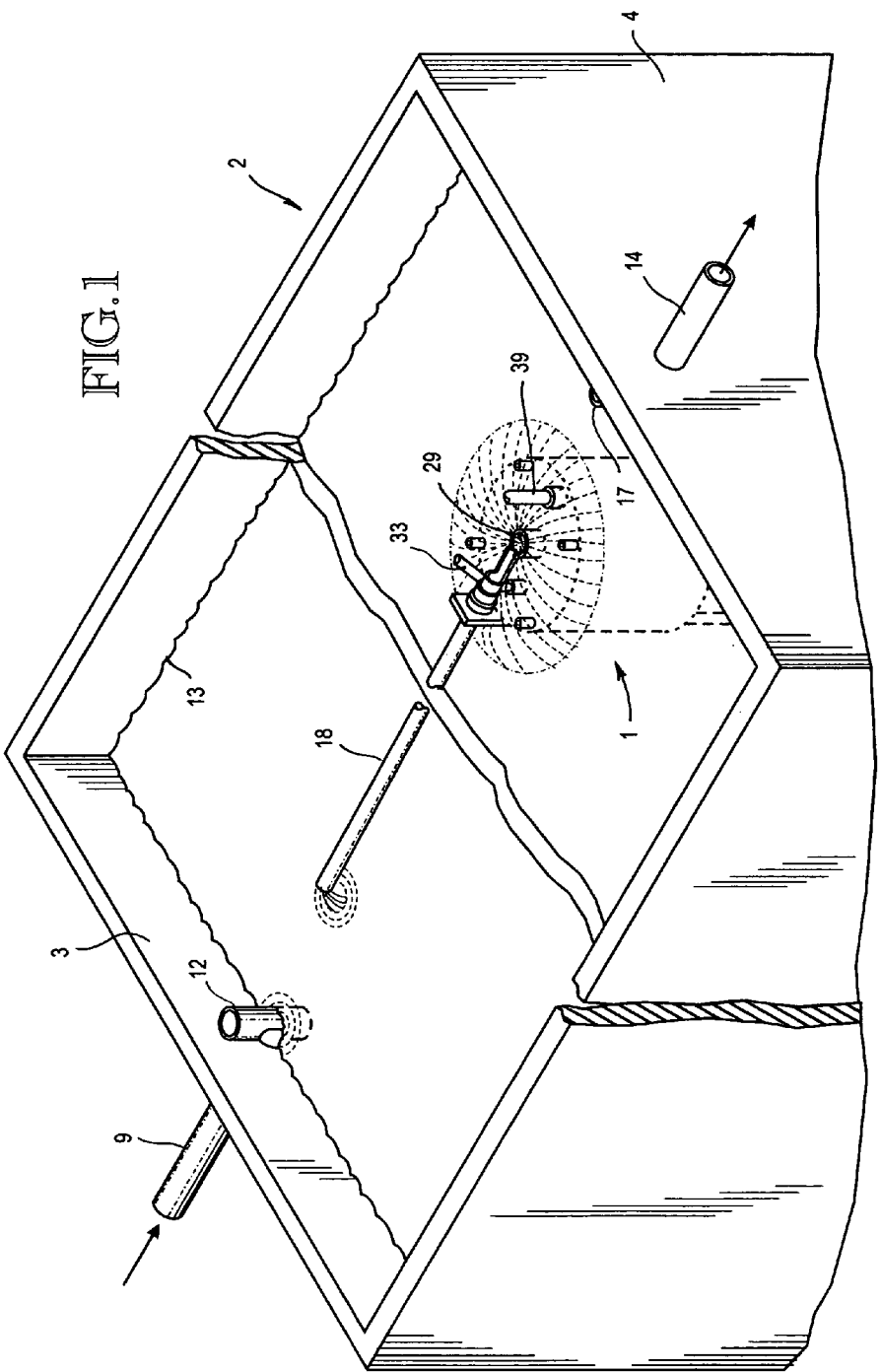
FIG. 1 is a perspective view of a septic tank installation embodying the wastewater treatment system.

Referring to FIG. 1, a typical installation of the treatment system includes the cylindrical pod reactor unit 1 and a typical septic tank 2 having an inlet end wall 3 and an outlet end wall 4. The tank 2 defines a confined volume and is usually located below ground level and will have a suitable removable lid (not shown) completely covering the tank. This relationship is shown more clearly in FIG. 8 wherein the lid 6 will also include suitable manhole or access covers 7 and 8 and may include suitable venting means (not shown). Although the typical underground septic tank will be referred to in the description of the preferred embodiment of the present invention, it will be understood that the invention may be utilized in conjunction with any type or configuration of anaerobic wastewater septic system. In the system shown, the tank 2 will be connected to the source of wastewater or sewage through the wastewater disposal line 9 emanating from a single or multiple family dwelling unit or a commercial establishment. The terminal end of the line 9 is normally mounted in the end wall 3 and includes a baffle 11 having a vent 12 extending above the liquid level line 13 as shown in FIG. 1. The end wall 4 is fitted with an effluent outlet line 14 also provided with a baffle 16 and air vent 17 in a well known manner. As is well known in the art, in the standard installation, wastewater will enter the tank 2 from the house or other source via the line 9, solids are settled out and collect at the bottom of the tank in a quiescent zone and the liquid effluent exits the tank via the outlet line 14 and flows to a suitable drain field or mound for final disposal. In the normal situation, the wastewater and biodegradable solids in the tank 2 undergo an anaerobic process whereby the biodegradable solids are digested by anaerobic microbes. This process is an extremely long and highly inefficient process, also producing noxious gasses during the process. The wastewater enters the tank, undergoes the anaerobic digestion process and, hopefully absent the settled solids, exits the tank through the line 14 in an anaerobic condition in which it remains until settled out in a drain field or is otherwise treated in some secondary system. It will be noted that the cylindrical pod is located near the outlet end of the tank 2 as illustrated in FIG. 1 and an optional return line 18 extends away from the pod toward the inlet end of the tank for a purpose presently to be described.

Figure 2:
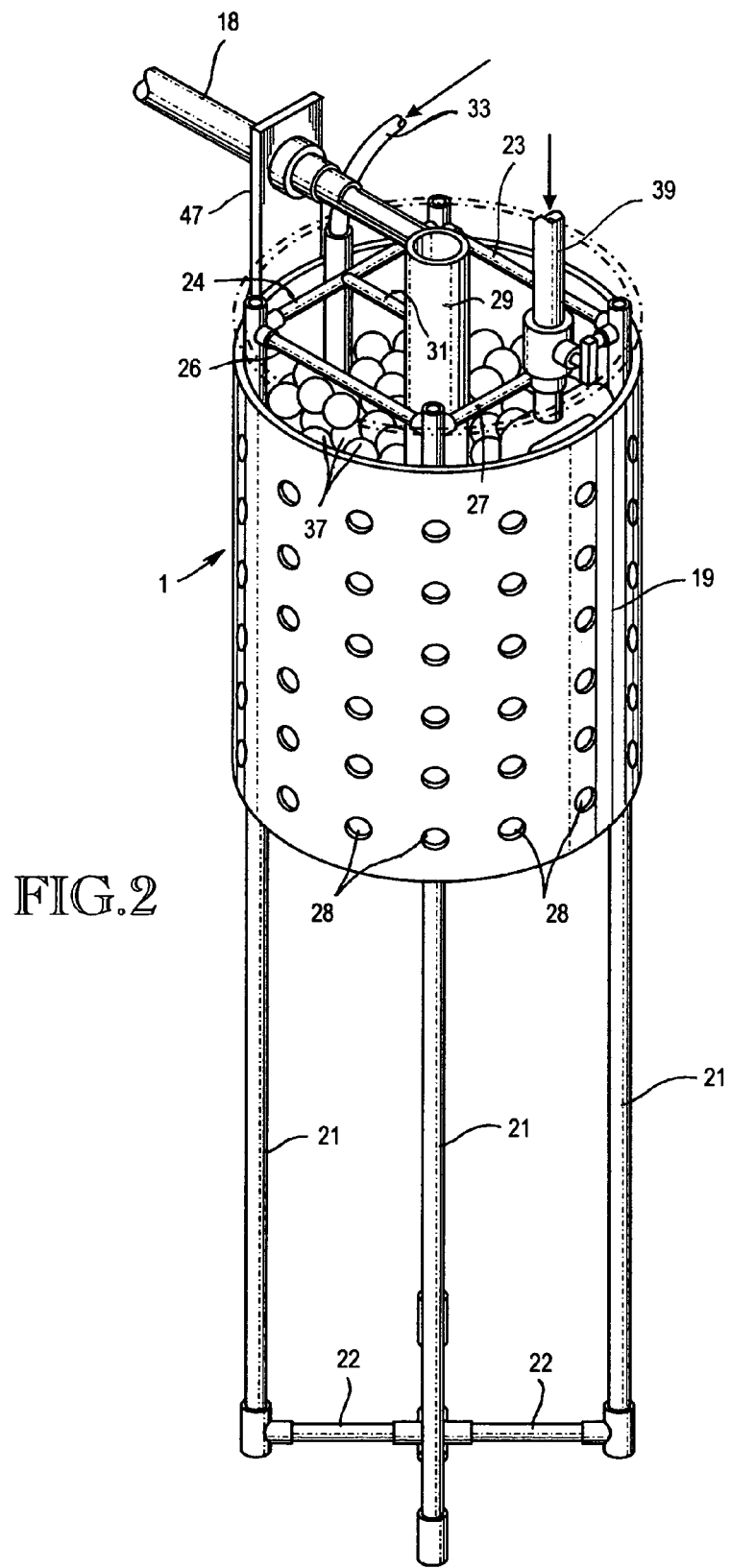
FIG. 2 is a perspective view of the reactor cylinder pod or mixing unit.
Figure 3:
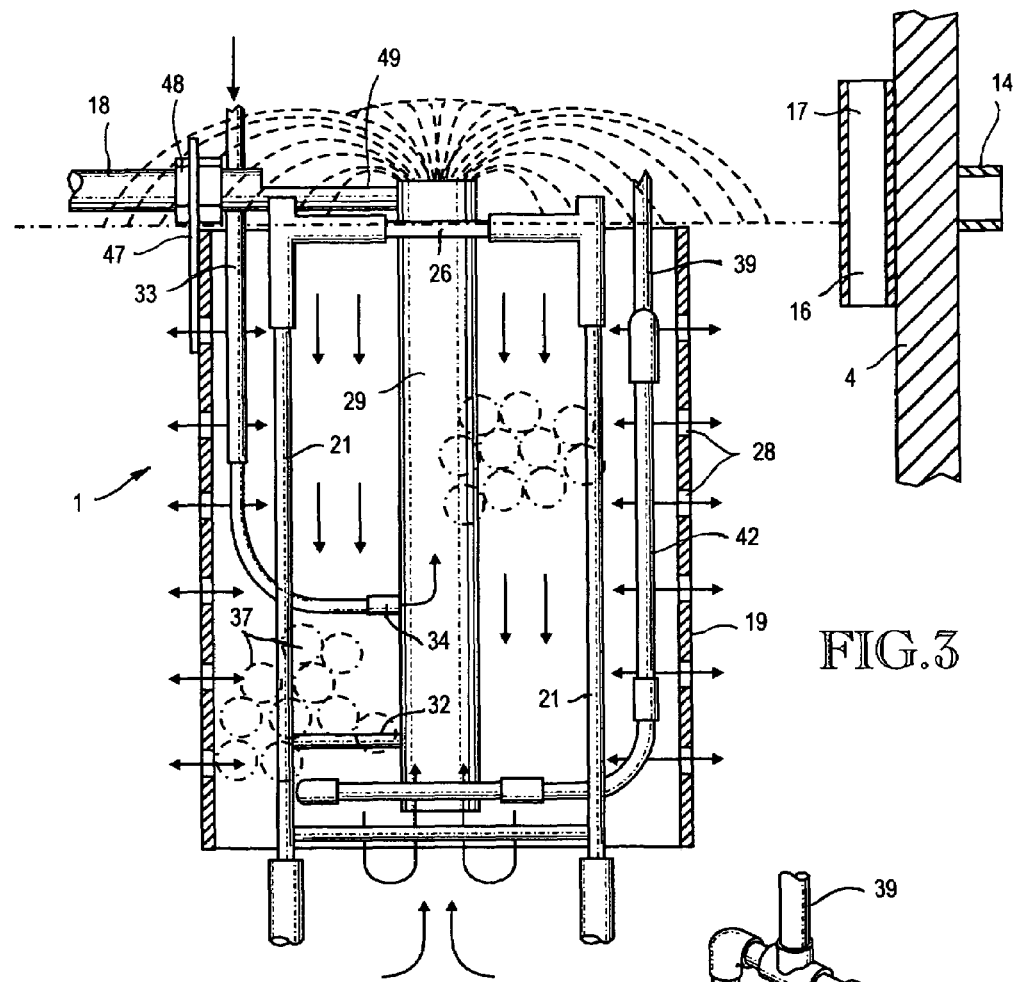
FIG. 3 is a partially sectioned view of the cylindrical pod in the aeration mode.
Figure 4:
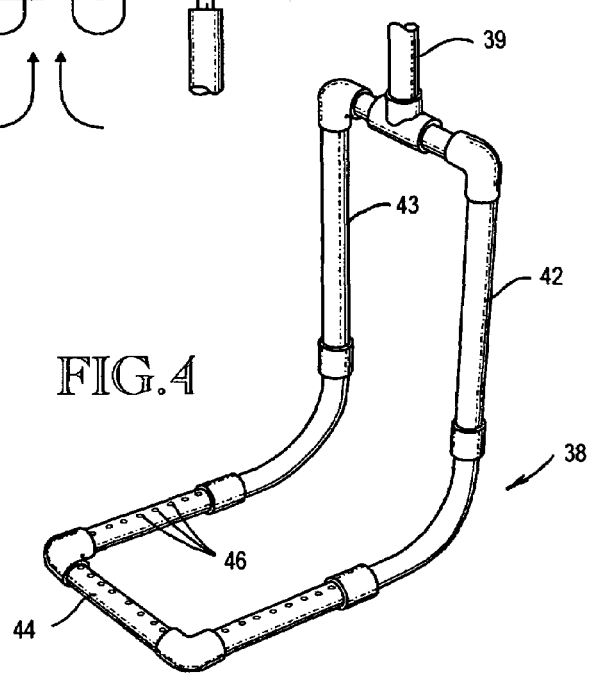
FIG. 4 is a perspective view of the back flush manifold.
Figure 3A:
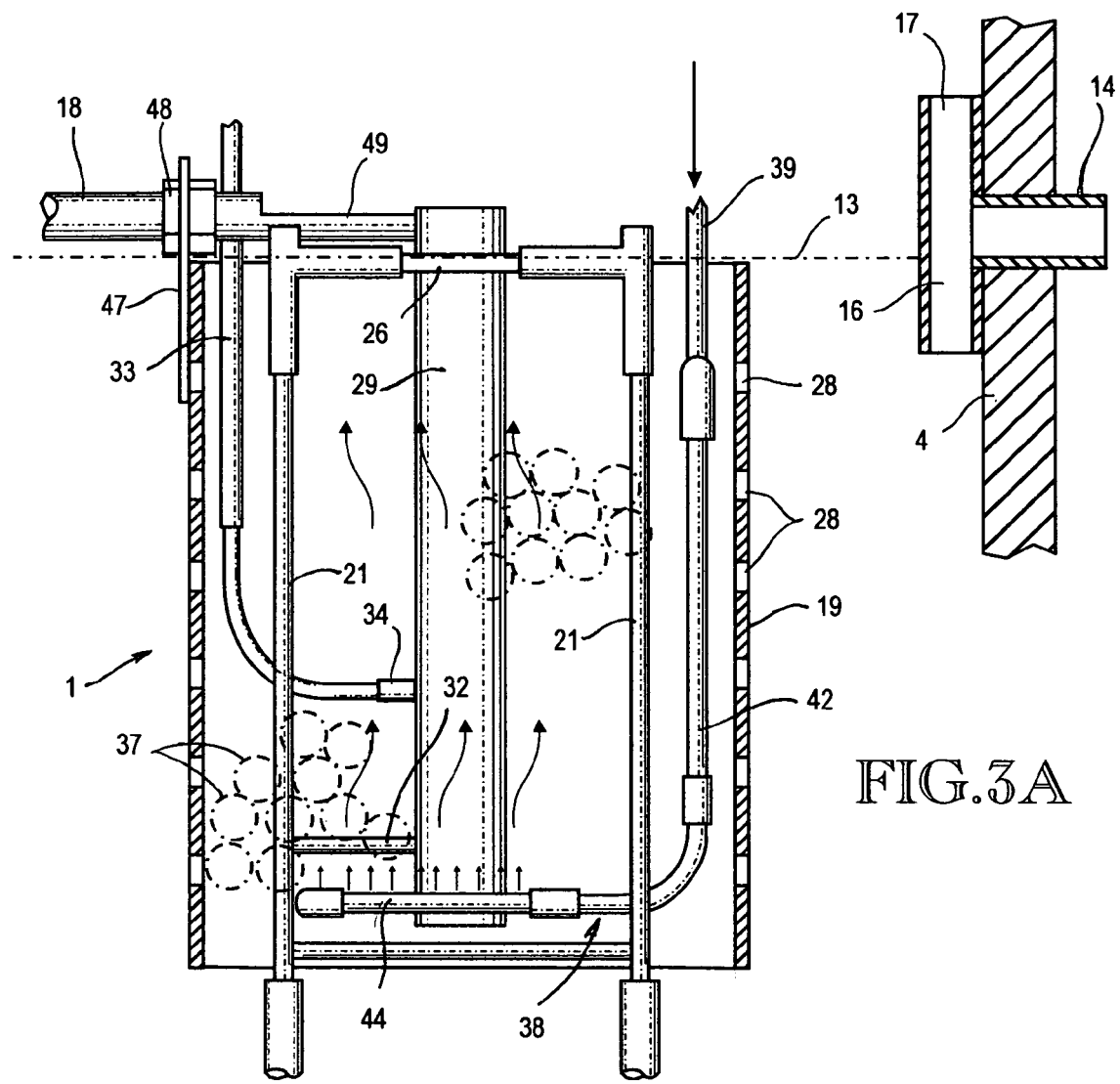
FIG. 3A is a cross sectional view of the cylindrical pod in the back flush mode.

The structural details of the cylindrical reactor pod or unit 1 are shown in FIGS. 2-4. Referring to FIG. 2, the unit 1 is a stand alone unit comprising the cylindrical reactor pod 19 supported by four leg members 21 preferably connected at their bottom ends by means of the cross bracing members 22 for stability. The upper extent of the legs 21 may be attached by any convenient means such as welding or fastener means to the internal framework of the cylinder 19. The upper ends of the leg members 21 may be connected and held in position by means of cross bracing 23-24 and 26-27. The legs 21 will extend upwardly through the cylinder 19 to the position adjacent to or shortly above the upper rim of the cylinder 19 which has been cut away in FIG. 2 to better illustrate the structural details. It will also be noted that the upper and lower ends of the cylinder are open to allow free liquid flow therethrough. As seen most clearly in FIG. 8, the bottom ends of the legs 21 are designed to be supported on the tank bottom and are of such an extent as to support the upper rim of the cylinder 19 preferably a distance of approximately 2 inches below the liquid level 13 of the tank when installed in the preferred embodiment. This relationship is shown in FIGS. 3 and 3A. In a typical 1000-2000 gallon tank, the cylinder 19 may have a height in the neighborhood of 2 feet and typical diameter of approximately 18 inches. In practice, the cylinder 19 may be formed from a tubular plastic material such as PVC and the leg members 21 and cross bracing members described may also be made from PVC tubing. The legs, the cylinder and the cross bracing may be conveniently connected by standard pipe fittings, plastic welding or fastener members as desired. It will also be noted that the cylinder 19, in addition to being open at top and bottom, is provided with perforations 28 to allow for free passage of liquid effluent through its wall surface. The size, number and spacings of these perforations may be varied as a matter of design depending upon the degree of circulation of liquor desired.

A centrally located draft tube is supported within the cylindrical reactor pod 19 by any convenient means such as the upper and lower connectors 31 and 32 respectively extending from one or more of the cross bracing 23-24 and 26-27. Any suitable alternative means for supporting the draft tube 29 within the cylinder pod 19, of course, is possible. Air under pressure is introduced into the draft tube 29 by means of the air pressure conduit 33 as seen in FIGS. 3 and 3A. The conduit 33 extends downwardly into the cylinder 19 exterior of the draft tube and is connected to the tube 29 through a free opening via fitting 34. The conduit 33 directs a stream of air under pressure from a pressure source such as the blower 36. As seen in FIG. 3, air under pressure introduced through the conduit 33 creates a pumping action which causes a flow of liquor vertically upwardly in the draft tube 29, pulling liquid from the area surrounding the pod 19 into the tube 29 and upwardly toward the open upper end of the tube.

The conduit 33 may comprise a PVC pipe in the order of ¼-2 inches in diameter and will be connected at the lower portion of the draft tube 29 to provide a clear unobstructed air stream into the draft tube, enhancing the pumping and mixing of the effluent as it flows upwardly through the draft tube. The draft tube 29 may have a diameter of approximately 3 inches in order to maximize the blower energy. As illustrated in FIGS. 1 and 3, sufficient pumping force will be developed so as to create an aerating spray or splash of aerated effluent from the upper open end of the tube with the splash area of the expelled aerated effluent being sufficient to reach beyond the upper peripheral edge of the cylinder pod 19. In this manner, the recirculating pattern of the liquor promotes oxygen transfer and treatment to the surrounding liquid in the tank. The upper end of the tube 29 may be maintained at or somewhat above the water level 13 of the tank in order to create the aerated spray or splash.

As illustrated in FIGS. 3 and 3A, the cylindrical reactor pod 19 will be filled with a multiplicity of buoyant media such as the spheres 37 which freely float within the pod. The media 37 are preferably composed of buoyant hollow plastic spheres that provide a high surface area to volume ratio in the order of 48 square feet per cubic foot or more with a 93.5% void space to promote oxygen transfer and circulation within the pod. This type of buoyant media and its function of providing maximum microbial growth surfaces is well known in the art and, although subject to modification, is the preferred media for the present system. The buoyant media does not tend to incur flocculent buildup during operation and avoids the consequent clogging typical of fixed or packed media treatment systems. As indicated by the arrows in FIG. 3, the cylinder pod 29 provides a mixing zone for the liquid effluent in the septic tank as the aerated oxygen rich liquor is pumped upwardly through the draft tube 29 and is caused to spill back down into the media 37 as well as into the general body of the liquor surrounding the cylinder pod. Additionally, the perforations 28 in the wall of the cylinder 19 provide a constant mixing and interchange of aerated and non-aerated liquid. Because of the available voids, aerobic biological growth takes place in the mixing zone with the buoyant media, which has a low resistance to liquid flow, providing a non turbulent zone with low oxygen loading rates, creating surface conditions receptive to aerobic microbial growth. Since the cylinder pod 19 is a free standing unit within the body of the liquid in the tank, it is not necessary to connect it structurally to the outlet of the tank either for support or liquid delivery, thus allowing the liquid level in the septic tank to remain constant. Because the cylindrical pod of the present invention is not attached to the outlet of the tank and does not have a lift feature intended for discharge, the mixed liquor within the tank remains at a constant volume. This constant volume relates to a constant volume of sewage treated to a specific level. In the present configuration, the sewage enters the septic tank of the inlet conduit 9, is mixed with oxygen rich liquor treated by the cylinder pod 19 and immediately flows out of the tank through the exit line 14. Under normal operating conditions this results in a specific detention time for sewage within the tank. Because of the perforations 28 in the cylinder 19, liquor is allowed to flow into and out of the treatment unit, as shown by the arrows in FIG. 3, creating a recirculating pattern which enhances oxygen transfer and treatment to the surrounding body of liquid. The cylinder pod 19 is thus not directly processing effluent and discharging it into the drain field but rather is treating the entire tank volume.

Figure 8:
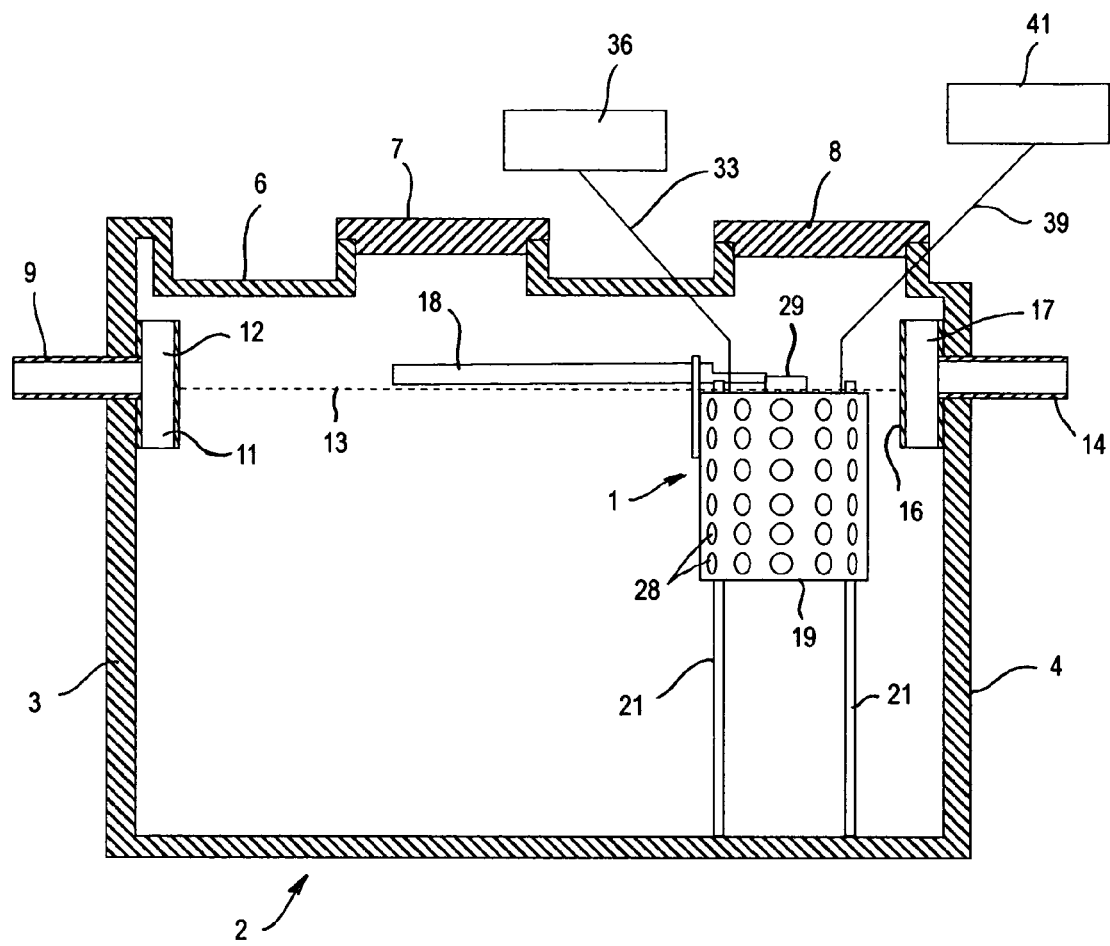
FIG. 8 is a diagrammatic illustration of the free standing cylindrical pod and optional return line arrangement.

Although the buoyant media 37 of the type under consideration is not normally subjected to clogging because of microbial build up, causing the process to become anaerobic, in the case of constant organic overload, the present system incorporates a back flushing feature for scrubbing off organic build up and creating a turbulent zone to increase treatment and oxygen transfer if desired. Referring specifically to FIGS. 3A and 4, a back flush air pressure manifold, indicated generally at 38 in FIG. 4, is suspended in the cylinder pod 19 and includes air pressure supply conduit 39 supplied with air under pressure from the blower unit 41 as shown in FIG. 8. The pressure conduit 39 is connected to an air pressure manifold which is in the shape of a loop comprising the downwardly directed conduits 42 and 43 connected to a diffuser 44 surrounding the bottom end of the draft tube 29. The manifold is provided with orifices 46 for releasing air jets upwardly, as shown by the arrows in FIG. 3A, through media 37. In the event of clogging or undue organic buildup on the media 37, the pumping air stream from conduit 33 is halted and the blower 41 is actuated to produce reverse air streams through the media 37 to flush the media 37. Although separate blowers 36 and 41 have been illustrated and discussed relative to the present embodiment, it will be understood, of course, that a single blower or compressor and appropriate valving and controls could be utilized as a source of air pressure for both of the lines 33 and 39 well within the skill of an artisan.

As discussed above, one of the objects of the present method, system and apparatus is to provide aerated and oxygen rich mixed liquor to the general area of the septic tank which may be accomplished in the main by (1) providing a free recirculation pattern and mixing zone between the pod and the surrounding effluent and (2) by creating a splash area of the outflow from the upper end of draft tube 29 in the mixing zone beyond the periphery of the cylinder reactor pod 19. With the perforations 28, a constant recirculation pattern is created with the surrounding tank volume providing increased dissolved oxygen within the tank to promote aerobic decomposition. In order to further enhance this process if required, a return line 18 may be mounted on the wall of the cylinder pod 19 for collecting aerated liquid expelled from the draft tube 29 and transporting it to the area preferably adjacent the inlet area of the tank as shown in FIGS. 1 and 5-8. Referring to the detail in FIG. 3, the return line 18 may be a plastic pipe supported by the bracket 47 and passing through a suitable retainer or collar 48 carried by the bracket. The bracket 47 is fixed to the wall of the cylindrical pod 19 and may be attached by such means as adhesives, plastic welding or fasteners of any suitable design. The line 18 is open at its distal end adjacent the inlet area of the tank to allow for discharge of mixed liquor and has its opposite end at the pod configured to collect outfall from the draft tube 29 as illustrated. The collector configuration on the end of the return line 18 can be conveniently formed by removing a top portion of the conduit as illustrated at 49 in FIG. 2. The conduit or return line 18 will be positioned above the water line 13 in the tank so as to provide an incline to accommodate gravity flow. The distance of the end of the conduit 18 above the water line 13 may be adjusted to accommodate any particular installation and will normally be in the range of 2-4 inches to ensure gravity flow. For this purpose, the bracket 47 may be made adjustable or, in the alternative, the position of the collar 48 in the bracket 47 may be made adjustable (not shown). It will also be noted that any form of collector apparatus may be substituted for the collector configuration 49 without departure from the spirit and scope of the invention. In a typical 1000-2000 gallon septic tank, the pumping rate through the draft tube 29 may be adjusted to deliver in the range 0-3500 gallons per day through the return line 18, providing good results in converting the septic tank volume to aerobic condition.

In practice it is often difficult to predict the actual organic waste load at a given site or the conditions may simply change and the organic waste load may increase for one reason or another. The present configuration of stand alone cylinder pod is not connected to, nor does it deliver liquid directly to the outlet of the tank and, in fact, is not in any way required to be structurally connected to the tank itself. This configuration lends flexibility, allowing additional pods or treatment cells to be added to the same tank compartment, thus enlarging the mixing zone without disturbing or modifying the existing septic tank. Since the present unit or pod 19 may have a nominal diameter of 18 inches, additional pods may be inserted through a standard 24 inch access opening usually provided in the tank lid. FIGS. 5-7 illustrate progressively a single, a double and a triple pod installation in a typical septic tank. Although subject to modifications, these pods are preferably located in an area adjacent the outlet of the tank. As illustrated in FIGS. 5-7, the tank may also include a compartment wall 51, shown in dotted lines creating a primary or inlet settling compartment 52 and a larger mixing and settling compartment 53. If such a configuration is utilized, it is recommended that the cylinder pod or pods be located in the larger area compartment of the tank. In this instance, of course, the return line will extend past the compartment wall 51 so as to deliver aerated liquor into the primary compartment 52. As shown in FIG. 5, a first access opening 7 may be located so as to access the distal end of the return line 18 and may also be sized and positioned to overlie the inlet baffle. A second access opening 8 is provided for the insertion, removal and manipulation of the pod 19. In the event of multiple pods, suitable collector units 49a and collector lines 18a will be utilized to deliver the liquor from the pods to return line 18. Additional pods may be arranged with suitable collector devices and return lines to channel the flow of aerated liquor from the pods to a suitable return line.

Although the preferred embodiment has been described and illustrated utilizing a free standing cylindrical pod unit in order to gain the advantage of easy addition and removal of the units, it would of course be possible to support the units via connection to the tank structure. In such a case, however, the ability of free removal, replacement and/or addition of pod units without disturbing the tank structure may be forfeited.

While the present invention has been illustrated and described according to a preferred embodiment and certain alternatives, it is to be understood that further modifications and variations in the apparatus and treatment method may occur to those skilled in the art which are considered to be well within the intended scope and spirit of the present invention. For example, the apparatus and method may be combined with other sewage treatment apparatus and the present apparatus and method may be applied to a wide variety of septic tank capacities and configurations. In this connection, the dimensions and exact configuration details of the various parts of the apparatus may be modified as well as the choice of materials and assembly methods used in constructing the apparatus. The exact air pressure controls utilized is deemed well within the skill of those conversant in the art as are the flow rates and air pressure values required to provide any design result. The scope of the invention, therefor, is only to be limited by the claims appended hereto.

What is claimed is:

1. A wastewater treatment system comprising;

a wastewater collection tank comprising a confined volume, said tank including a wastewater inlet for receiving wastewater containing biodegradable material and an outlet for outflow of treated effluent to a disposal site, said outlet defining the liquid level in the tank, said tank providing a first quiescent zone in the general area of said inlet for settling the major portion of solids from the wastewater to form a liquor in the confined volume of said tank and a second mixing zone in the general area of said outlet, a perforated-wall open-ended reactor pod located in said second zone and submerged in said liquor, said pod being provided with a quantity of buoyant aerobic bacterial growth media, an open ended draft tube supported in the central section of said reactor pod, an air pressure conduit extending from a source of air under pressure and connected to the lower portion of the draft tube for introducing an air pressure stream providing a pumping force to pull liquor upwardly therethrough and to expel liquor in an aerating splash pattern from the top of the draft tube, said pumping force being sufficient to form said splash pattern so as to return a first given portion of aerated liquor onto the media within the pod and a second substantial portion to the general area of said second zone adjacent the reactor pod for recirculation by said draft tube, said perforated wall of the pod permitting free exchange of mixed and unmixed liquor between the pod and media and the general volume of the tank, said treated recirculated liquor effluent being allowed to freely flow out of the tank through said outlet to maintain a constant liquid level in the tank.

2. The wastewater treatment system of claim 1 including;

a return line extending from said splash pattern to the quiescent zone, a collector connected to the return line in the splash zone for collecting a third given portion of aerated liquor for return to the quiescent zone by gravity flow.

3. The wastewater treatment system of claim 1 including;

a back flushing manifold located in the bottom portion of said reactor pod, an air pressure source for selectively providing air under pressure to said manifold, said manifold introducing air streams upwardly through said media for scrubbing off organic build up and creating a turbulent zone to increase treatment capacity and oxygen transfer.

4. The wastewater treatment system of claim 1 wherein said waste water tank comprises a septic tank including a lid with at least one access opening, said reactor pod comprising a cylinder having a plurality of perforations in the wall thereof and being sized for passing through the access opening, and support means for supporting said reactor pod in the septic tank as a free standing unit, whereby the treatment capacity of the septic tank may be increased and decreased by inserting and withdrawing self contained reactor pods through the access opening.

5. A method for treatment of wastewater within a confined volume, comprising the steps of;

settling out solids in a quiescent zone to form a liquor, pumping liquor from a mixing zone upwardly through an open draft tube so as to expel liquor in an aerating splash pattern, placing aerobic bacterial growth media in a submerged perforate walled reactor pod located about said draft tube, controlling the pumping action to form said splash pattern for returning a first given portion of the aerated liquor onto said media and a second substantial portion to the mixing zone beyond said pod, said perforate wall of the reactor pod permitting free exchange of mixed and unmixed liquor between the reactor pod and growth media and said confined volume.

6. The method according to claim 5 including the further steps of;

collecting a third given portion of said aerated liquor, and channeling said third portion of aerated liquor to said quiescent zone.

7. The method according to claim 5 including the further step of;

selectively introducing back flushing air streams upwardly through said media for scrubbing off organic build up and creating a turbulent zone to increase treatment capacity and oxygen transfer.

8. A method for treatment of wastewater within a confined volume, comprising the steps of;

directing wastewater into said confined volume, settling out the major portion of solids from the wastewater in a quiescent zone to form a liquor, pumping liquor from a mixing zone upwardly through an open draft tube by introduction of an air pressure stream within the draft tube so as to expel liquor in an aerating splash pattern, placing aerobic bacterial growth media in a submerged perforate walled reactor pod located about said draft tube, controlling the air pressure stream to create a pumping action sufficient to form said splash pattern so as to return a first given portion of the aerated liquor onto said media and a second substantial portion to the mixing zone beyond the reactor pod, said perforate wall of the reactor pod permitting free exchange of mixed and unmixed liquor between the reactor pod and growth media and said confined volume, and allowing treated effluent to exit said contained volume to maintain a constant level of liquor.

9. The method according to claim 8 including the further steps of;

collecting a third given portion of said aerated liquor from said splash pattern, and channeling said third portion of aerated liquor to said quiescent zone.

10. The method according to claim 8 including the further steps of;

selectively introducing back flushing air streams upwardly through said media for scrubbing off organic build up and creating a turbulent zone to increase treatment capacity and oxygen transfer.

11. A method for treatment of wastewater containing biodegradable material within a septic tank having a confined volume, a wastewater source inlet and a drain field disposal outlet, comprising the steps of;

directing wastewater from said source into said tank through said inlet, settling out the major portion of contained biodegradable solids from the wastewater in a first quiescent zone in the general area of said inlet to form a liquor in the confined volume of the septic tank, pumping liquor from a second adjacent mixing zone in the general area of said outlet upwardly through an open draft tube by introduction of an air pressure stream within the draft tube so as to expel liquor outwardly in an aerating splash pattern from the top end of the tube, surrounding the draft tube with aerobic bacterial growth media contained in a perforate walled reactor pod submerged in said second zone, controlling said air pressure stream to create a pumping action sufficient to form said splash pattern so as to return a first given portion of said aerated liquor onto said media within said pod and a second substantial portion to the general area of said second zone adjacent said pod, said perforate wall of said reactor pod permitting free exchange of mixed and unmixed liquor between the reactor pod and growth media and the general volume of the tank, and allowing free flow of oxygen rich aerobic effluent to exit said tank through said disposal outlet to maintain a constant level of treated liquor in said tank.

12. The method according to claim 11 including the further steps of;

collecting a third given portion of said aerated liquor from said splash pattern, and channeling said third portion of aerated liquor to said quiescent zone.

13. The method according to claim 11 including the further step of;
selectively introducing back flushing air streams upwardly through said media for scrubbing off organic build up and creating a turbulent zone to increase treatment capacity and oxygen transfer.

14. The method according to claim 11 wherein said septic tank includes a lid with at least one access opening, said reactor pod comprises a cylinder having a plurality of perforations in the wall thereof, said pod being a free standing unit supported within the septic tank and having a diameter sized for passing through the access opening, the method further including the step of;
selectively increasing and decreasing the treatment capacity of the septic tank by inserting and withdrawing self contained reactor pods through the access opening.

15. Apparatus for oxygen enrichment of the wastewater in a septic tank to provide aerobic microbial digestion of biological material, said tank including a wastewater inlet and a disposal outlet defining the liquid level of the wastewater liquor in the tank, said apparatus comprising;
a perforated wall reactor pod submerged in said liquor,
said pod being open at the top and bottom ends and provided with aerobic bacterial growth media,
an open ended draft tube supported in the reactor pod, and
an air pressure conduit providing air under pressure to the lower end of said draft tube creating a pumping force to expel aerated liquor from the top of the tube in a splash pattern,
said pumping force being sufficient to form said splash pattern so as to return a first given portion of aerated liquor onto the media within the pod and a second substantial portion to the general area surrounding the pod for recirculation by said draft tube,
said perforated wall permitting free interchange of mixed and unmixed liquor between the pod and media and the area surrounding the pod.

16. The apparatus according to claim 15, wherein;
said reactor pod comprises an open ended cylinder having a top rim and a plurality of perforations in the wall thereof for free exchange of mixed and unmixed liquor between the pod and media and the area surrounding the cylinder.

17. The apparatus according to claim 16 wherein said septic tank includes a bottom wall, said apparatus including;
support structure for supporting said cylinder on the bottom wall of the tank with the top rim thereof below the water line.

18. The apparatus according to claim 17 wherein said media comprises buoyant spheres adapted for collecting aerobic bacterial growth on the surface thereof.

19. The apparatus according to claim 18 including;
support structure for supporting said draft tube vertically within the central portion of said cylinder with the top end thereof above the water line and the lower end adjacent the bottom end of the cylinder,
said media surrounding said draft tube.

20. The apparatus according to claim 17 wherein said septic tank includes a lid with at least one access opening, said cylinder and support structure therefor being sized for passing through the access opening for inserting and withdrawing the reactor pod into and out of the septic tank.

21. The apparatus according to claim 16 including;
a back flushing manifold having openings therein for producing air jets,
means for introducing air under pressure into said manifold, and
support structure for supporting said manifold adjacent the bottom end of said reactor pod for producing air jets directed upwardly through said media.

22. The apparatus according to claim 15 including;
a return line conduit having one end supported on said reactor pod and extending to a location remote from the general area surrounding said reactor pod, and
collector means on said one end of the return line conduit located within the splash pattern for collecting a third portion of aerated liquor and conducting the same by gravity flow to said remote location.

23. A system for treating a body of wastewater, comprising;
a reactor pod submersed in said wastewater, said reactor pod enclosing aerobic bacteria growth media,
a draft tube in said reactor pod, and
means for pumping wastewater through said draft tube to form an aerating splash pattern,
said pumping means being sufficient to form said splash pattern for returning a first portion to the media and a second portion to the wastewater surrounding the reactor pod.

24. The system of claim 23 wherein said reactor pod includes a perforated wall permitting free exchange of treated and untreated wastewater between the reactor pod and media and the general body of wastewater.

25. The system of claim 23 wherein said reactor pod includes open top and bottom ends for free passage of wastewater, and
said bacteria growth media comprises a plurality of free floating buoyant spheres.

26. The system of claim 25, including;
a back flushing manifold located in the bottom portion of said reactor pod for introducing air pressure streams through said media for scrubbing off organic build up.

27. The system of claim 23 including;
a return line extending from said splash pattern to a location in said body of wastewater remote from said reactor pod, and
a collector connected to the return line for collecting a third portion of aerated wastewater for return to said remote location.

28. Apparatus for treating a body of wastewater comprising;
a reactor pod submersed in said body of wastewater,
bacteria growth media enclosed in said reactor pod,
a draft tube in said reactor pod, and
means for pumping wastewater through said draft tube to form an aerating splash pattern for returning a first portion to the media and a second portion to the wastewater surrounding the reactor pod.

29. The apparatus of claim 28 wherein said reactor pod includes a perforated wall.

30. The apparatus of claim 28 wherein said reactor pod includes open top and bottom ends, said bacteria growth media comprising a plurality of free floating buoyant spheres.

31. The apparatus of claim 30 including back flushing manifold means for introducing air pressure streams through said media for scrubbing off organic build up.

32. The apparatus of claim 28 including;
collector and conduit means for collecting and conducting a third portion of aerated wastewater to a location in said body of wastewater remote from said reactor pod.

33. A method for treating a body of wastewater, comprising the steps of;
submersing a reactor pod in said wastewater,
placing aerobic bacterial growth media in said reactor pod,
pumping wastewater through a draft tube within said reactor pod so as to form a splash pattern for returning a first portion to the media and a second portion to the wastewater surrounding the reactor pod.

34. The method of claim 33 including the further step of;
providing for free exchange of treated and untreated wastewater between the reactor pod and growth media and the general body of wastewater.

35. The method of claim 33 including the further step of;
collecting a third portion of wastewater from said splash pattern and channeling said third portion to a location in said body of wastewater remote from said reactor pod.

36. The method of claim 33 including the further step of;
introducing back flushing air pressure streams through said media for scrubbing off organic build up.

* * * * *